United States Patent
Riegel

(10) Patent No.: US 10,025,642 B2
(45) Date of Patent: Jul. 17, 2018

(54) WAKE-UP ORDERING OF PROCESSING STREAMS USING SEQUENTIAL IDENTIFIERS

(71) Applicant: Red Hat, Inc., Raleigh, NC (US)

(72) Inventor: Torvald Riegel, Dresden (DE)

(73) Assignee: Red Hat, Inc., Raleigh, NC (US)

( * ) Notice: Subject to any disclaimer, the term of this patent is extended or adjusted under 35 U.S.C. 154(b) by 116 days.

(21) Appl. No.: 14/552,734

(22) Filed: Nov. 25, 2014

(65) Prior Publication Data

US 2016/0147576 A1    May 26, 2016

(51) Int. Cl.
G06F 9/52    (2006.01)
G06F 9/48    (2006.01)

(52) U.S. Cl.
CPC .............. *G06F 9/526* (2013.01); *G06F 9/485* (2013.01)

(58) Field of Classification Search
None
See application file for complete search history.

(56) References Cited

U.S. PATENT DOCUMENTS

| | | | |
|---|---|---|---|
| 6,026,427 A | 2/2000 | Nishihara et al. | |
| 7,783,649 B2 | 8/2010 | Molnar et al. | |
| 7,962,923 B2 | 6/2011 | Hopkins | |
| 8,578,380 B1 | 11/2013 | Adams et al. | |
| 8,595,729 B2 * | 11/2013 | Rosenbluth | G06F 9/526 |
| | | | 718/102 |
| 2007/0022429 A1 * | 1/2007 | Rosenbluth | G06F 9/52 |
| | | | 718/108 |
| 2011/0264712 A1 | 10/2011 | Ylonen | |
| 2012/0166777 A1 * | 6/2012 | McLellan | G06F 9/3851 |
| | | | 712/245 |
| 2012/0311273 A1 | 12/2012 | Marathe et al. | |
| 2013/0013534 A1 | 1/2013 | Chang et al. | |
| 2013/0174166 A1 * | 7/2013 | Otenko | G06F 9/526 |
| | | | 718/102 |

FOREIGN PATENT DOCUMENTS

IN    01607MU2011    12/2012

OTHER PUBLICATIONS

"Condition Variables", 2014, 15 pages, http://pages.cs.wisc.edu/~remzi/OSTEP/threads-cv.pdf.
Ulrich Drepper, Futexes Are Tricky; Jun. 27, 2014, 11 pages, http://dept-info.labri.fr/~denis/Enseignement/2008-IR/Articles/01-futex.pdf.

* cited by examiner

*Primary Examiner* — Fahmida Rahman
(74) *Attorney, Agent, or Firm* — Lowenstein Sandler LLP

(57) ABSTRACT

Systems and methods for waking up waiting processing streams in a manner that reduces the number of spurious wakeups. An example method may comprise: assigning a first identifier of a sequence of identifiers to a processing stream in a waiting state; receiving a wakeup signal associated with a second identifier of the sequence of identifiers; comparing, by a processing device, the first identifier with the second identifier; and waking the processing stream responsive to determining, in view of comparing, that the processing stream began waiting prior to an initiation of the wakeup signal.

19 Claims, 6 Drawing Sheets

Time Line 200

WAKE-UP ORDERING OF PROCESSING STREAMS USING SEQUENTIAL IDENTIFIERS

TECHNICAL FIELD

The present disclosure is generally related to computer systems, and is more specifically related to synchronizing access to shared computing resources.

BACKGROUND

Many computing systems support the execution of multiple threads to perform tasks in parallel. During execution, the threads may contend for access to a shared resource that is necessary to complete their tasks. The computing systems may handle contention by allowing multiple threads to wait (e.g., sleep) for a particular shared resource and while they are waiting may associate the threads with a condition variable. When the resource is modified the computing system may access the condition variable to determine which threads are waiting and subsequently send a notification to wake them up.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
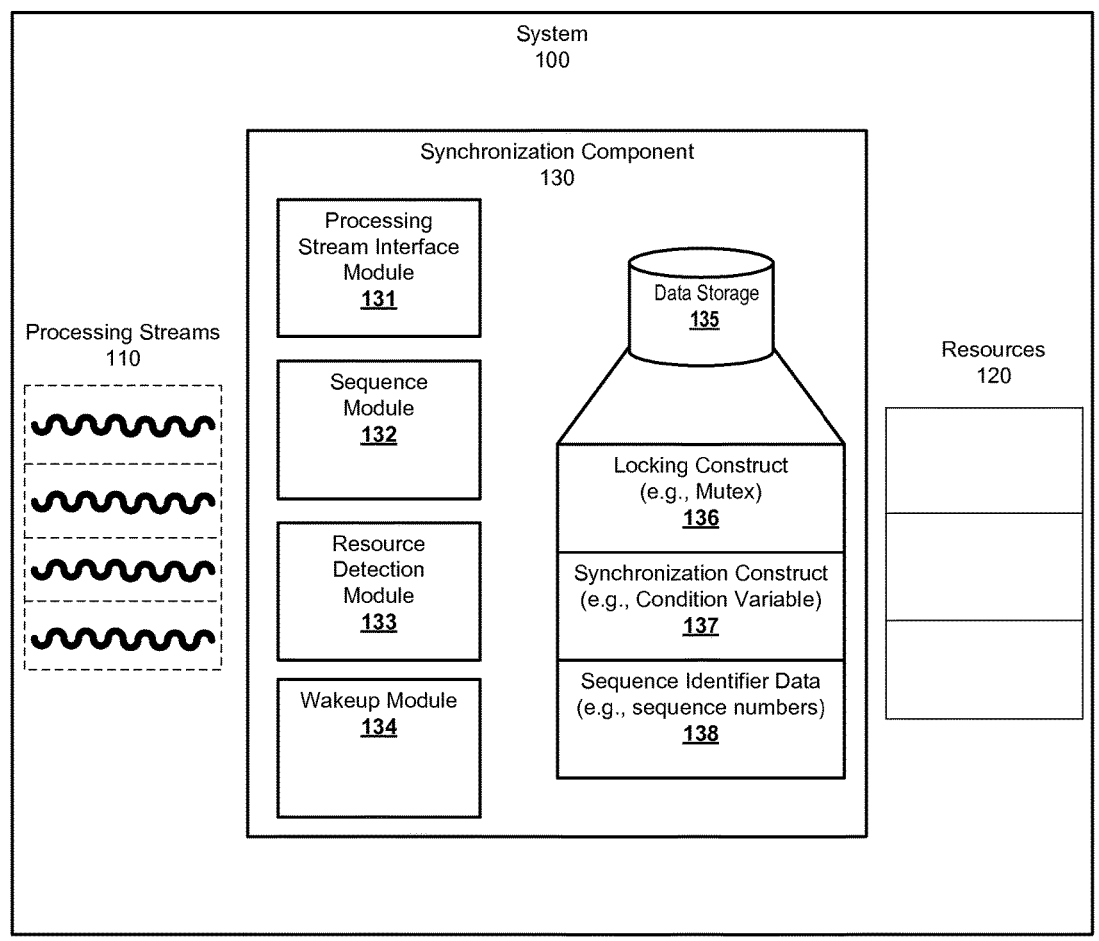
FIG. 1 depicts a block diagram of one illustrative example of a system in accordance with one or more aspects of the present disclosure.

Described herein are methods and systems for utilizing a synchronization data structure and synchronization algorithm to wakeup waiting processing streams (e.g., threads) in a manner that reduces spurious wakeups. Spurious wakeups may occur for a variety of reasons, for example, a processing stream may begin waiting during a delay between when a resource is modified (e.g., wakeup signal initiated) and when the wakeup signal is processed. When the processing stream begins waiting, it may be associated with a condition variable and when the wakeup signal is subsequently processed each processing stream identified by the condition variable may be awoken. When the processing stream that was added during the delay wakes up, it may discover that the variable has not changed and therefore the wakeup may be considered a spurious wakeup. Spurious wakeups are often an inefficient use of system resources and it may be advantageous to reduce their occurrences The synchronization data structures and synchronization algorithm may reduce spurious wakeups by associating a sequence of identifiers with processing streams and wakeup signals. The identifiers may comprise numeric values that represent the chronological order in which the processing streams began waiting and the initiation of the wakeup signals occur. The sequence identifiers may have a static size (e.g., 32 bits) and may be part of a synchronization data structure (e.g., futex) that is stored in shared memory.

In one example, the identifiers may be sequence numbers and the algorithm may analyze the sequence numbers when a wakeup signal is received to decide which processing streams are eligible to be woken up and thus reduce spurious wakeups. The algorithm may distinguish between multiple processing streams by comparing the sequence number of the wakeup signal and the sequence numbers of the processing streams. When a processing stream has a lower sequence number it may indicate the processing stream began waiting prior to the initiation of the wakeup signal and therefore may be eligible to be woken up. Whereas a processing stream that has a higher sequence number may have begun waiting after the initiation of the wakeup signal and therefore may be ineligible to be woken up.

In another example, the algorithm may utilize the sequence numbers in combination with processing stream groups to further enhance the performance of the wakeup operations (e.g., reduce the number of spurious wakeups). The processing stream groups may function to separate the processing streams that are eligible to be woken up (e.g., first group) from the processing streams that are not eligible (e.g., second group). When a wakeup signal is received, the algorithm may analyze the processing streams associated with the first group and therefore may avoid accessing or analyze the processing streams of the second stream. Once the wakeup signal has been processed (e.g., consumed) the synchronization algorithm may update the groups by identifying the next unconsumed wakeup signal. The synchronization algorithm may also transfer processing streams from the second group to the first group if the processing streams have sequence numbers below the next unconsumed wakeup signal. Updating the groups may keep the first group current so that it may be used to reduce spurious wakeups when the next wakeup signal is received Various aspects of the above referenced methods and systems are described in details herein below by way of examples, rather than by way of limitation.

FIG. 1 is a block diagram illustrating an exemplary system 100 that may be used to synchronize processing streams and notify processing streams when shared resources are modified. The system 100 may comprise processing streams 110, resources 120 and synchronization component 130. Processing streams 110 may comprise streams that execute programmed instructions and may be managed by an operating system. The processing streams 110 may be executed concurrently by a computing device that supports multiple processing units. The processing units may be provided by multiple processors or from a single processor with multiple cores or a combination of both. In one example, a processing stream may be a computing thread, such as a system thread, user thread or fiber. In another example, the processing stream may comprise a computing process, such as system process, user process or background process (e.g., daemon) and may comprise one or more computing threads. Each of the processing streams 110 may comprise a thread control block, one or more counters (e.g., program counters) and a state (e.g., running, ready, waiting, start, done). The thread control block may be an operating system manifestation of the processing stream and may comprise a plurality of thread register values and a stack pointer that may point to the computing thread stack of the computing process.

Resources 120 may comprise units of physical or virtual resources that are internal or external to a computing device. A physical resource may be any resource associated with a tangible component, such as a piece of hardware. Virtual resources may include logical or abstract representations and may include files (e.g., file handles), network connections (e.g., network sockets, bandwidth), processing time, logical memory (e.g., virtual memory) or virtual machine resources (e.g., Java Virtual Machine (JVM)) or other similar resources. Internal resources may comprise internal system components, such as memory (e.g., main memory, L1-3 Cache), processing devices (e.g., processors, cores), storage space (e.g., hard disc), network adapter (e.g., WiFi Card, Ethernet card) and other similar tangible resources. External resources may include system resources that are external to the computing device, such as for example, peripheral devices (e.g., external hard drives, display devices or input/output devices).

Synchronization component 130 may also comprise processing stream interface module 131, sequence module 132, resource detection module 133 and wakeup module 134. Processing stream interface module 131 may allow processing streams to submit requests to be notified when a resource is modified or becomes available. The request may specify a resource (e.g., memory address) and a condition to be evaluated, such as whether the specific resource was modified or whether in contains a specific value. When a processing stream requests notification (e.g., registers) the processing stream may be associated with a sequence identifier by sequence module.

Sequence module 132 may associate (e.g., assign, link, relate) sequence identifier 138 to each processing stream and to each wakeup signal. Sequence identifiers 138 may indicate the chronological order in which the processing streams began waiting and the wakeup signals were initiated. Each of the sequence identifiers 138 may be numeric or alphanumeric value and may be associated in consecutive order without skipping intermediate values. The sequence identifiers 138 may be stored within shared memory or within memory accessible by the processing stream only. Each of the sequence identifiers 138 may comprise a variable that has a static size, which may be determined prior to runtime, such as, at design, development or compile time. The size may remain static throughout the execution of the program. In one example, the sequence identifier may have a statue size equal to a word length of the hardware architectures (e.g., 32 bit, 64 bit) and may be stored within a futex variable associated with the synchronization construct or processing stream. In another example, the sequence identifiers may have a dynamic size, which may adjust during run time to compensate for larger values.

Sequence identifiers 138 may be reset when their values hit a certain sequence identifier threshold value. Resetting the values may avoid problems associated with overflow which may occur when continuously incrementing or decrementing a variable with a static size. The sequence identifier threshold value may depend on the size of the sequence identifier, for example, when the sequence identifier is a 32 bit number there may only be 2^32 possible states. Each of these states may correspond to a sequence identifier and therefore when the largest state is reached the system may need to reset the value to start over again. The largest state achievable may be the sequence identifier threshold value, so a 32 bit sequence identifier may have a sequence identifier threshold value of approximately 2,147,483,647 when a signed integer value is used or 4,294,967,295 when implemented using an unsigned integer value.

The reset operation may comprise modifying the sequence identifiers of the waiting processing streams. In one example, the reset operation may modify the synchronization construct 137 to indicate it is in a reset state and may wakeup (e.g., spuriously) some or all of the waiting processing streams that have been assigned a sequence identifier. The reset operation may then modify the sequence identifier of each of the awoken processing streams and set their sequence identifiers to corresponding lower values, for example, if at the time the sequence identifier threshold value is reached there may be 15 waiting processing streams, occupying the upper most states of the sequence identifier variable (e.g., highest values). When the threshold is reached, the 15 waiting processing streams may be awoken and assigned values associated with the lower most states (e.g., values 1-15). This may be advantageous because it allows the identifiers to continue to be assigned in an increasing sequence without having to handle a sequence that includes a range of sequence identifiers that wrap around or overflow past a zero value. Once the reset operation is complete the sequence assignment module 132 may continue to iterate until the sequence identifier threshold is hit, at which point the reset operation would be executed again. In one example, the wakeup may be similar to a broadcast wakeup that waits for each waiting processing stream to be woken up and subsequently reset before assigning sequence identifiers to processing streams that attempted to wait during the reset operation.

In another example, the reset operation may be similar to the above reset operation and may also utilize a generation counter. The generation counter may persist through multiple reset operations and may be incremented each time a reset operation begins and again when it is completed. The waiting processing stream may be provided access to the generation counter and may increment the generation counter to an odd value to signal when the reset state is completed (e.g., quiescence period finished). Processing streams that begin waiting during the reset state (e.g., generation counter even) may be tracked and subsequently processed once the reset has completed. The subsequent processing may comprise spuriously waking up these processing streams and assigning them sequence identifiers.

Resource detection module 133 may monitor resources 120 and determine whether a portion of resource 120 has changed. Resource detection module 133 may interact with one or more operating system components to identify when resource 120 has been modified. In one example, this may involve handling interrupts (e.g., software or hardware interrupts).

Wakeup module 134 may interact with resource detection module 133 and may notify processing streams 110 when the resource is modified or a specified condition has been fulfilled. The notification may comprise transmitting a wakeup signal to one or more processing streams. The wakeup signals may be a single signal initiated to wake up a single waiting processing stream or the signal may be a broadcast signal that may wake up multiple (e.g., all) waiting processing streams.

Synchronization component 130 may also comprise data storage 135, which may comprise locking constructs 136, synchronization constructs 137 and sequence identifier data 138. Locking construct 136 may be a data structure that a computing system may utilize to manage access of processing streams to a group of shared resources. Locking construct 136 may include one or more variables, which may be accessed directly or indirectly by processing streams 110. In one example, locking construct 136 may comprise or utilize a mutex or futex data structures and their associated operations.

Synchronization Construct 137 may be the underlying data structure utilized by synchronization component 130 to enable processing streams to wait (e.g., block) for certain conditions of a resource to become true. Synchronization construct 137 may comprise a condition variable and may function as a container for processing streams 110 that are in a waiting state. Synchronization construct 137 may exist in shared-memory and may store sequence identifiers 138 of multiple processing streams. Sequence identifiers 138 may be used as futex variables or may be used in association with futexes. In another example, sequence identifiers 138 may be stored in non-shared memory, for example, in a futex of the processing stream.

In one example, synchronization construct 137 may enable processing streams to wait for signals by providing functions for waiting and for initiating (e.g., sending) wakeup signals, similar to those discussed above. The functions associated with synchronization construct 137 and synchronization component 130 may operate atomically and in a designated order. For example, wait functions may execute as three separate atomic steps: (1) releasing the locking construct 136 and entering a waiting state; (2) waking up (e.g., exiting the waiting state); and (3) acquiring the locking construct again. Each of these separate atomic steps may execute in order that is consistent with happens-before relationship. The happens-before relation is a relation between the results of multiple events. The relation may ensure that if those events are executed out of order, which may occur as result of program optimizations, any event designated as happening before another event must be executed before an event that is designated as relying on that event occurring. This may allow a resource (e.g., memory) modified by an operation that is intended to happen-before to be completed and accessible by an operation that is designated as a subsequent operation.

In another example, synchronization construct 137 may comprise a futex data structure and associated futex based operations. A futex data structure is a "Fast Userspace Mutex" and may be a data structure of an Operating System (e.g., Linux, Unix, Windows, Macintosh) that may be accessible to processing streams via programming calls. A futex may comprise a kernel space wait queue that is associated with an aligned integer in user space. Multiple processing streams may operate on the integer in user space (e.g., futex variable) using atomic operations and may only resort to system calls to request operations on the queue of waiting processing streams 110. The operations may include waking up a waiting process, or adding a current processing stream on wait queue. A futex-based lock construct 136 may avoid system calls until a lock is in contention, such as when there are more processing streams attempting to access the resource then there are available resource units.

Futex operations may be utilized by processing streams to access data stored within the futex data structure. One operation is a wait operation, which allows a processing stream to wait for a specified value or change of value of a specified resource variable or resource address. As discussed above, a wait operation may atomically verify that the specified address still contains the specified value and sleeps awaiting a wakeup signal. A wakeup operation initiates the generation of a wakeup signal for any or all processing streams waiting for the specified address (e.g., variable) to change.

Figure 2:
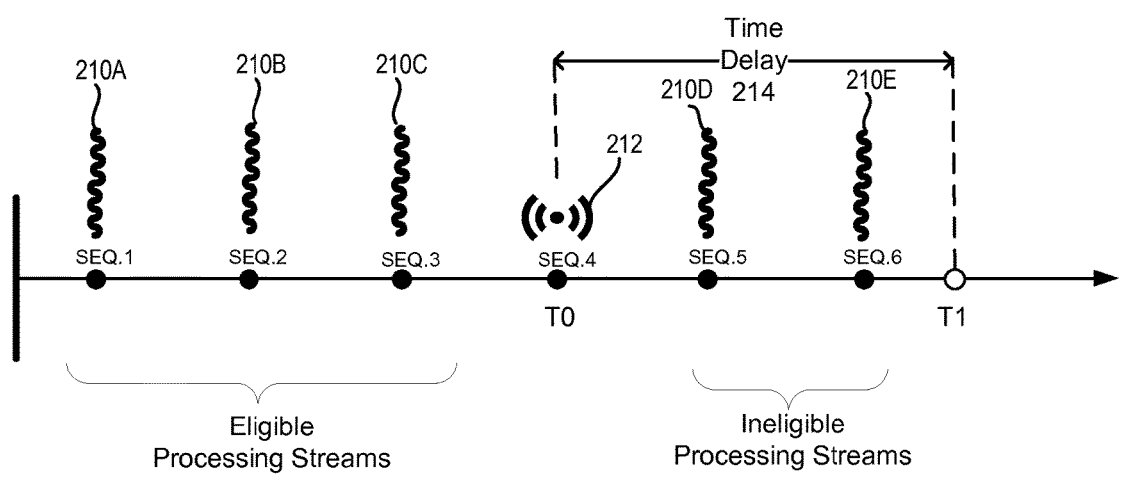
FIG. 2 depict a time line illustrating the use of sequence identifiers in accordance with one or more aspects of the present disclosure.

FIG. 2 depicts a timeline 200 that may help demonstrate when spurious wakeups occur and how sequence identifiers 138 may be used to reduce the number of spurious wakeups. Timeline 200 may comprise multiple sequence identifiers SEQ.1-6 that may be associated with wakeup signal 212 and processing streams 210A-E. Wakeup signal 212 may be associated with a time delay 214 between when wakeup signal is initiated (i.e., time T0) and when the wakeup signal is received or processed (i.e., time T1). During time delay 214 processing streams 210D and 210E may begin waiting (e.g., initiate a wait function) and as such may be subject to being spuriously awoken. Spurious wakeups may occur when a processing stream transitions to a waiting state awaiting a change to a resource but is woken up before a modification is made to the resource. Allowing spurious wakeups may allow an implementation to be less complex but may result in an inefficient use of resources.

As shown by timeline 200, processing stream 210A may begin waiting for a resource and may be associated with SEQ.1. Sometime later, processing streams 210B and 210C may begin waiting for the same resource and may be associated with SEQ. 2 and SEQ. 3 respectively. At time T0, the resource may be modified and the system may initiate wakeup signal 212. To simplify the explanation, the resource may not be modified at any other point on timeline 200. The synchronization component 130 may associate sequence identifier SEQ.4 with wakeup signal 212. Although wakeup signal 212 is initiated at time T0 there may be a delay before it is received and processed at time T1, as represented by time delay 214. During time delay 214, processing streams 210D and 210E may begin waiting for the resource. At time T1, wakeup signal 212 may be processed and synchronization component 130 may wakeup waiting processing streams 210A-E. Waking up processing streams 210A-C may be appropriate because the resource may have been modified since processing streams 210A-C began waiting. The wakeup of processing streams 210D and 210E, however, may not be appropriate, since they began waiting after the modification occurred. Therefore, the wakeup of 210D and 210E may be considered spurious wakeups.

The spurious wakeup of processing streams 210D and 210E may be avoided by utilizing synchronization construct 137 and the synchronization algorithm discussed above. By associating sequence identifiers SEQ.1-6 with processing streams 210A-D and wakeup signal 212 the synchronization algorithm may determine the chronological order in which the processing streams and wakeups signals occurred. For example, when wakeup signal 212 is received at time T1 the system may compare the identifier of the wakeup signal (e.g., SEQ.4) with the identifiers of the processing streams (e.g., SEQ.1-3 and SEQ.5-6) to determine which processing streams are eligible to be woken up. In doing so, the synchronization algorithm may determine that processing streams 210D and 210E have sequence numbers (e.g., SEQ.5 and 6) that are higher than the sequence identifier of the wakeup signal (e.g., SEQ.4) and therefore may not be eligible to be woken up by wakeup signal 212. On the other hand, the synchronization algorithm may determine that processing streams 210A-C have sequence numbers (e.g., SEQ1-3) that have lower sequence identifiers and may therefore be eligible to be woken up. In one example, synchronization data structure 137 and synchronization algorithm may provide a strong wakeup guarantee that ensures that signal 212 wakes up one or more of the eligible processing streams (e.g., 210A-C).

Figure 3:
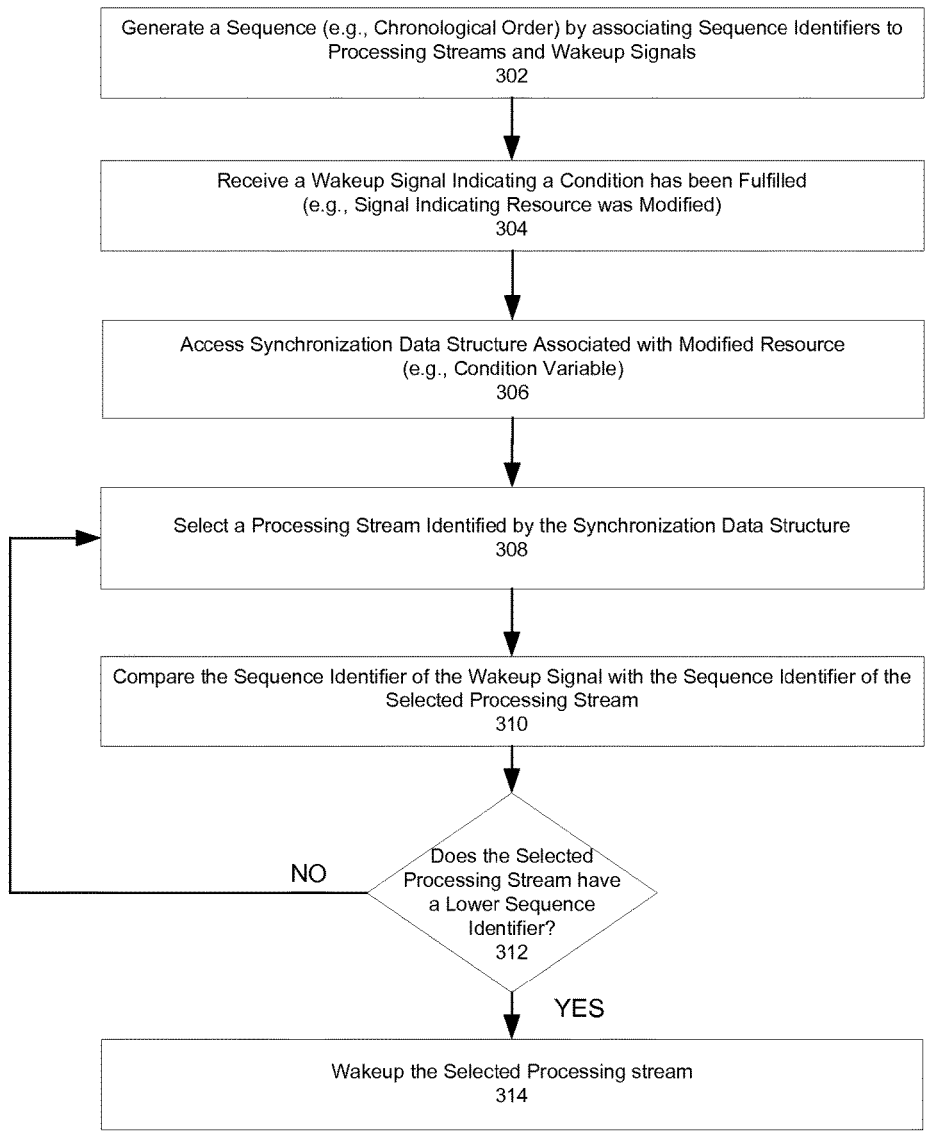
FIG. 3 depicts a flow diagram of an example method for utilizing sequence identifiers in accordance with one or more aspects of the present disclosure.

FIG. 3 depicts a flow diagram of one illustrative example of a method 300 for utilizing sequence identifiers 138 to reduce spurious wakeups, in accordance with one or more aspects of the present disclosure. Method 300 and each of its individual blocks, functions, routines, subroutines, or operations may be performed by one or more processors of the computer device executing the method. In certain implementations, method 300 may be performed by a single processor. Alternatively, method 300 may be performed by two or more processors, each processor executing one or more individual functions, routines, subroutines, or operations of the method.

At block 302, the processing device may generate a sequence (e.g., chronological order) by associating sequence identifiers with processing streams and wakeup signals. The processing device may associate a sequence identifier (e.g., SEQ1) with a processing stream when the processing stream initiates a wait function or enters a waiting state. When subsequent processing streams initiate wait functions the processing device may associate each processing stream the next available sequence identifier (e.g., SEQ.2 and SEQ.3 respectively). When a wakeup signal is initiated the processing device may associate the next available sequence identifier (e.g., SEQ.4). The sequence identifiers associated with a wakeup signal may be the identical sequence identifier that would have been associated with a processing stream if the processing stream were to initiate a wait function prior to the institution of the wakeup signal.

At block 304, the processing device may receive a wakeup signal indicating a condition has been fulfilled. In one example, the wakeup signal may indicate a computing resource has been modified. As illustrated earlier, a wakeup signal may be initiated by the processing device yet there may be a delay before the wakeup signal is received and processed.

At block 306, the processing device may access the synchronization data structure that is associated with the resource. In one example, the synchronization data structure may include a condition variable that identifies multiple processing streams that began waiting for the resource to be modified.

At block 308, the processing device may select a processing stream identified by the condition variable. When the condition variable identifies multiple processing streams the processing device may base the selection on which processing stream has waited the longest. This may be determined using the sequence numbers (e.g., lower sequence number may indicate a longer wait) or it may be based on another method, for example, whether the processing stream is next on a waiting queue.

At block 310, the processing device may compare the sequence identifier of the wakeup signal with the sequence identifier of the selected processing stream. In one example, the sequence identifiers may comprise numeric information (e.g., number value) and comparing the sequence identifiers may comprise evaluating the numeric information to determine which piece of numeric information evaluates to a lower value. In another example, the sequence identifiers may include non-numeric information, which may be cast into numeric information and subsequently compared, for example, alphabetic characters may be cast to their ASCII or Unicode value and compared.

At block 312, the processing device may evaluate the results of the comparison and establish whether the selected processing stream has a lower sequence identifier. If the processing stream does not have a lower sequence number the processing device may branch back to block 308 and check another (e.g., next) processing stream identified by the condition variable. In one example, the processing device may continuously branch back to block 308 (e.g., iterate) until either it checks all of the processing streams identified by the condition variable or finds a processing stream that has a lower sequence identifier (e.g., began waiting before wakeup signal). Once found, the method may proceed to block 314.

At block 314, the processing device may wakeup the selected processing stream. In one example, this may comprise generating a new signal that identifies the selected processing stream. In another example, this may comprise redirecting or forwarding the initial wakeup signal to the selected processing stream. Either of these examples may result in the selected processing stream transitioning out of the waiting state and may represent a wakeup signal that has been consumed. As discussed above, the signal may be a broadcast signal, in which case it may wakeup multiple processing streams and as a result may return to block 308 and continue to wake up all the processing streams that have sequence number that are less that the sequence number of the broadcast wakeup signal. Responsive to completing the operations described herein above with references to block 314, the method may terminate.

Figure 4A:
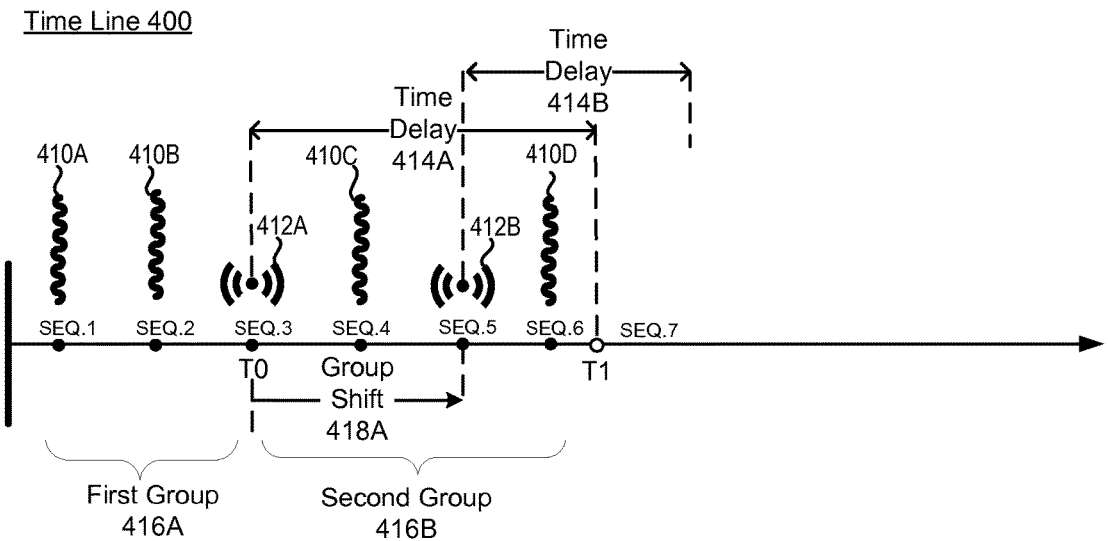
FIGS. 4A and 4B depict time lines illustrating the use of sequence identifiers and processing stream groups in accordance with one or more aspects of the present disclosure.
Figure 4B:
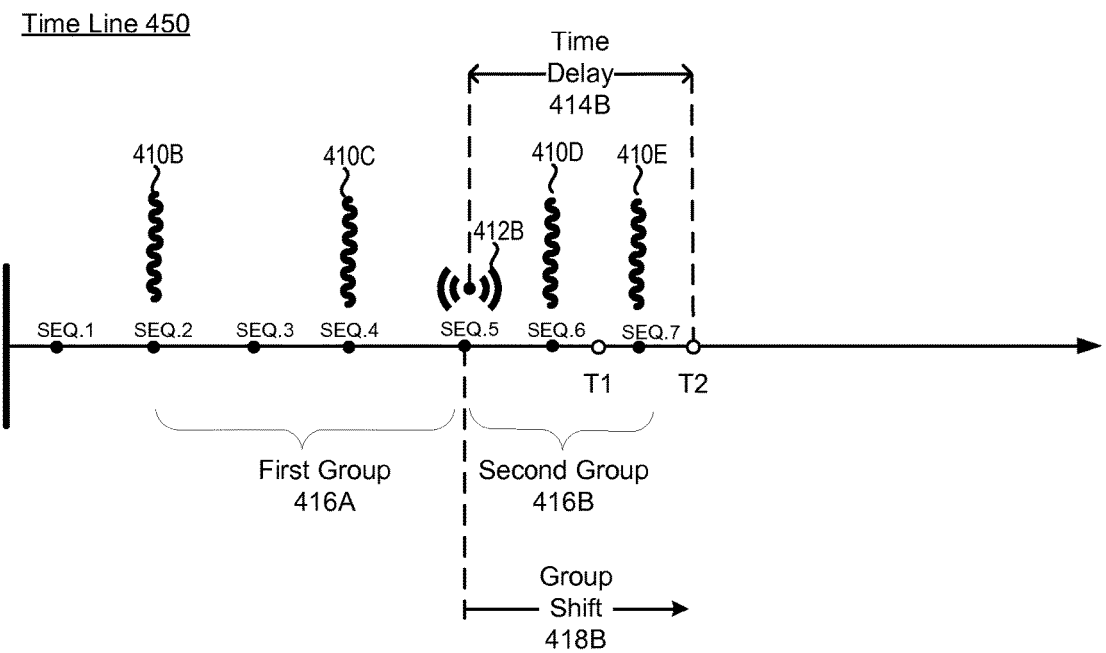

FIGS. 4A and 4B comprise timelines 400 and 450 and help illustrate an example synchronization algorithm that utilizes sequence identifiers in combination with multiple groups to further enhance the processing of wakeup signals. Timelines 400 and 450 may be similar to timeline 200 and may collectively comprise processing streams 410AE, wakeup signals 412A and 412B and groups 416A and 416B. Groups 416A and 416B may identify one or more processing streams and may function to separate processing streams that are eligible to consume a wakeup signal from processing streams that are ineligible to consume a wakeup signal. As time progresses, a processing stream may be transferred from a non-consuming group (e.g., second group 416B) to a consuming group (e.g., first group 416A). In one example, a processing stream may include a group variable that associates the processing stream with a specified group and transferring a processing stream from one group to another may comprise modifying the variable of the processing stream to identify a different group.

The synchronization algorithm may determine which processing stream belongs to which group by comparing the sequence identifier of the processing stream with the sequence identifier of the earliest unconsumed wakeup signal. The earliest unconsumed wakeup signal is a wakeup signal that has been initiated but has not yet been received and processed. For example, wakeup signal 412A was initiated at time T0 but may not be received and processed until time T1. Prior to time T1, the synchronization algorithm may determine the earliest unconsumed wakeup signal is wakeup signal 412A and therefore may associate the processing streams that began waiting prior to wakeup signal 412A, such as processing streams 410A and 410B, with first group 416A. The synchronization algorithm may also associate the processing streams that began waiting after the earliest unconsumed wakeup signal, such as processing stream 410C-D, with second group 416B.

After the earliest unconsumed wakeup signal 412A is consumed (e.g., time T1) groups 416A and 416B may be updated based on the next earliest unconsumed wakeup signal (e.g., 412B). The updating may involve modifying first group 416A to include processing streams that began waiting prior to the next earliest unconsumed wakeup signal, as illustrated by group shift 418A. As such, first group 416 may be updated to include all of the processing streams that began waiting before wakeup signal 412B, for example, processing streams 410B-D. In addition to group shifting, first group 416A may also be modified to remove the one or more processing streams (e.g., 410A) that have been woken up by, for example, consuming wakeup signal 412A.

Second group 416B may also be modified when the earliest unconsumed wakeup signal (e.g., 412A) has been consumed. For example, after wakeup signal 412A is consumed at time T1, processing stream 410C may be moved from second group 416B to the first group 414A. This is illustrated by group shift 418A, which slides the boundaries of second group 416B toward (e.g., up to) the next unconsumed wakeup signal (e.g., 412B). In one example, second group 416B may also be modified to include additional processing streams that begin waiting after the earliest unconsumed wakeup signal (e.g., 412B).

In another example, there may be more than two groups and additional processing streams that begin waiting after the next earliest unconsumed wakeup up signal (e.g., 412B) may be associated with an additional group. The additional group (e.g., third group and forth group) may share a boundary with its preceding group and a subsequent group.

The synchronization algorithm may include optimizations that may reduce the quantity of groups or the amount of modifications necessary to maintain the groups (e.g., group shifts). In one example, there may be a situation where there are enough signals in the second group to wake-up all the waiters that would otherwise move to the first group. In this situation, the synchronization algorithm may wakeup the processing threads in the second group without moving them to the first group. In another example, there may be a situation where the first group may have more waiting processing streams than wakeup signals. In this situation, the synchronization algorithm may use wakeup signals in a subsequent group to wake up the remaining processing streams in the first group and effectively drain the first group of eligible processing streams. Draining the first group may allow the first group to be removed and therefore reduce the total number of groups necessary. As shown in FIG. 4A, this may comprise avoiding group shift 418A by having wakeup signal 412B wake up the remaining processing stream 410B. Although processing stream 410C may be eligible to be woken up, since it was initiated prior to wakeup signal 418B, the optimization may artificially reduce the eligible processing streams to only those currently in first group 416A so that its processing streams are woken up first. This optimization may enhance performance because the subsequent group may now function as (e.g., replace) the first group and therefore the processing streams associated with the subsequent group do not have to be moved or modified in order to become eligible to be woken up. Referring now to FIG. 4B without including the above optimizations, at time T2 the second wakeup signal (e.g., 412B) may be consumed which may result in another group shift 418B. The result of group shift 418B may be different from group shift 418A because there may not be another unconsumed wakeup signal. As shown by timeline 450, prior to time T2, wakeup signal 412B may have been initiated but may not have been processed yet. First group 416A may include processing streams 410B and 410 C and second group 410B may include processing stream 410D and 410E. After time T2 arrives, wakeup signal 412B may be processed and processing stream 410B may be awoken and subsequently removed from first group 416A, since it is no longer waiting.

The processing of wakeup signal 412B at time T2 may also cause some or all of the processing streams of second group 416B to be transitioned to first group 416A. This may empty second group 416B, which may remain empty until another wakeup call is initiated. In one example, a second group may remain empty if there are no unconsumed wakeup calls. Once a wakeup signal is initiated, any processing streams that subsequently begins waiting may be associated with second group 416B, however once all signals are consumed it may be emptied again.

Figure 5:
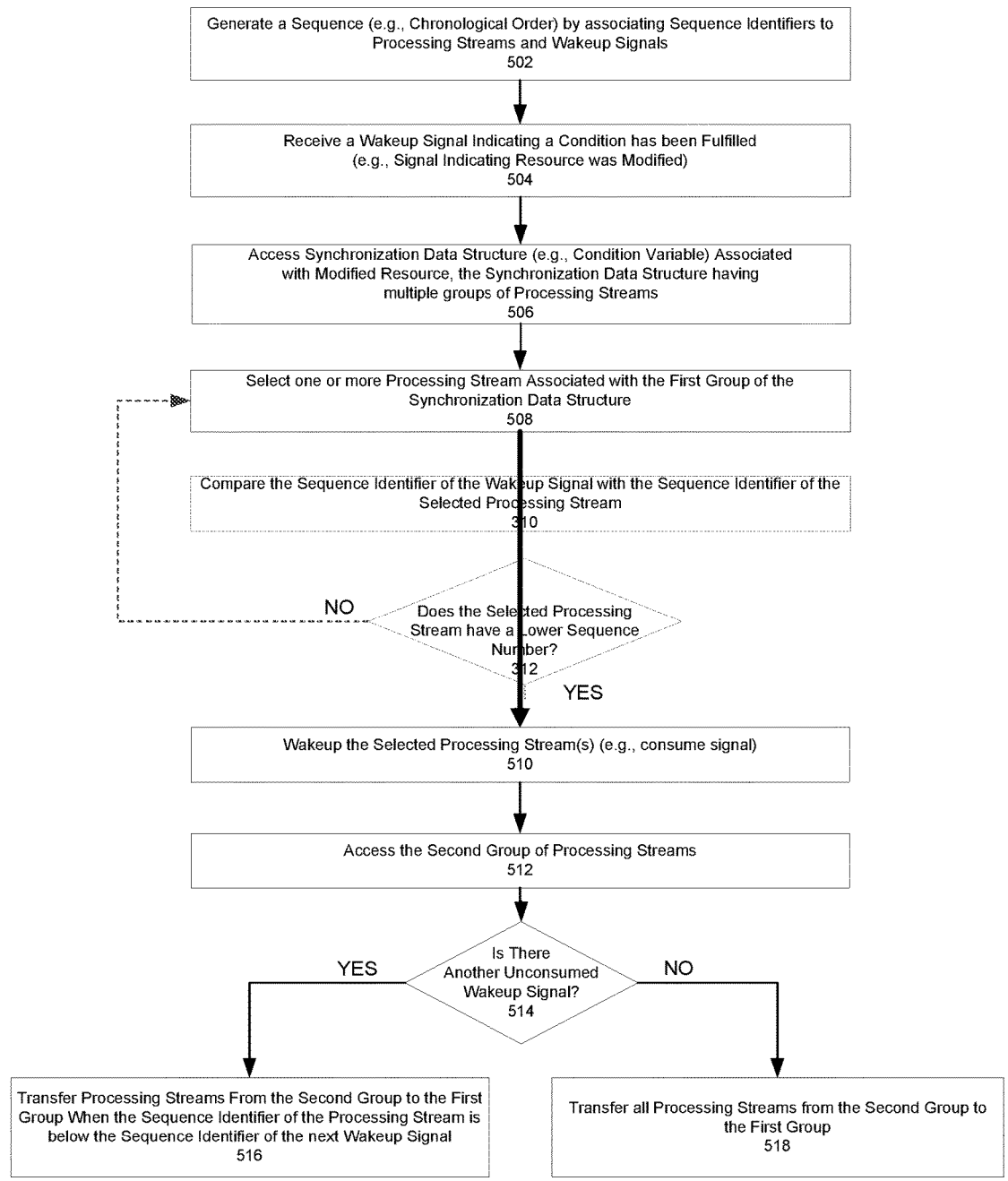
FIG. 5 depicts another flow diagram of an example method for utilizing sequence identifiers in combination with processing stream groups in accordance with one or more aspects of the present disclosure.

FIG. 5 depicts a flow diagram of one illustrative example of a method 500 for utilizing sequence identifiers in combination with groups of process stream to enhance wakeup operations (e.g., reduce spurious wakeups), in accordance with one or more aspects of the present disclosure. Method 500 and each of its individual blocks, functions, routines, subroutines, or operations may be performed by one or more processors of the computer device executing the method. In certain implementations, method 500 may be performed by a single processor. Alternatively, methods 500 may be performed by two or more processors, each processor executing one or more individual functions, routines, subroutines, or operations of the method.

Method 500 may be similar to method 300 discussed above with respect to FIG. 3. Both methods may generate a sequence by associating sequence identifiers to processing streams and wakeup signals. Methods 300 and 500 may also receive wakeup signals that indicate a condition has been fulfilled and access synchronization data structure associated with the resource that may have been modified. Method 500 includes the steps of method 300 and also includes steps pertaining to accessing and updating processing groups 416A and 416B.

At block 506, the methods may begin to differ because the synchronization structure of method 500 may have multiple groups of processing streams (e.g., first group 416A and second group 416B). The multiple groups of processing streams may be associated with the condition variable or may be associated with multiple condition variables. In one example, the first group of processing streams may comprise processing streams eligible to be woken up by the next unconsumed wakeup signal, whereas the second or subsequent groups may include processing streams that are not eligible to be woken up by the next unconsumed wakeup signal (e.g., they began waiting after the wakeup signal was initiated).

At block 508, the processing device may select one or more processing streams identified by the first group of the synchronization data structure. The first group may identify processing streams that began waiting prior to earliest unconsumed wakeup signal and therefore the sequence numbers of the processing streams in the first group may have a lower sequence number than the wakeup signal. This may allow method 500 to skip the sequence comparison blocks of method 300, as illustrated by the arrow superimposed over dotted blocks 310 and 312. This may be advantageous because the blocks that may be skipped may be time consuming or may result in spurious wakeups. For example, when the sequence numbers are stored as a variable within the processing stream (e.g., non-shared memory) the comparison may have to wake up the processing stream to perform the comparison. If the sequence number is larger than the wakeup signal the wakeup may be a spurious wakeup.

At block 510, the processing device may wakeup the processing stream(s) associated with the first group. There is no need to compare the sequence numbers prior to performing the wake up because the fact that the processing stream is in the first group may ensure that the sequence number is lower than the wakeup signal being processed. Although method 500 may avoid performing comparison steps prior to the wakeup of the processing stream, it may perform a similar comparison at another point in time, such as before receiving a wakeup signal or before the signal is generated. Method 500 may also introduce other steps (e.g., bocks 512-518) to keep the groups of processing streams current.

At block 512, the processing device may access the second group of processing streams. As discussed above, the second group of processing streams are those streams that have a higher sequence number than the recently processed wakeup signal. Now that the previous wakeup signal was processed, the system may determine whether there are other unconsumed wakeup signals, as shown in block 514. In one example, this may involve iterating through the sequence to identify a wakeup signal, if there are multiple wakeup signals in the sequence it would identify the wakeup signal with the lowest sequence number. In another example, this may involve utilizing a list (e.g., queue) of unconsumed wakeup signals for identifying the next wakeup signal on the list. When the processing device determines that there are no unconsumed wakeup signals at this time the processing device may transfer all processing streams identified in the second group to the first group, which is illustrated in FIG. 4A as group shift 418A. When the processing device determines that there is at least one unconsumed wakeup signal it may proceed to block 516.

At block 516, the processing device may transfer some or all of the processing streams from the second group to the first group. This may involve a comparison step similar to 310 and 312 wherein the sequence identifier of the next unconsumed wakeup signal is compared with the sequence number of the processing streams in the second group to determine if the processing stream has a lower sequence identifier. If the processing stream has a lower identifier it will be moved to the first group and if it does not it will remain in the second group. Although method 500 may perform similar comparison steps it may be advantageous to perform these steps after the wakeup signal is processed (e.g., in the background) as opposed to in response to receiving the wakeup signal as may be done for method 300.

At block 518, the processing device may transfer all of the processing streams from second group 418B to the first group 416A. Responsive to completing the operations described herein above with references to block 516 or 518, the method may terminate.

Figure 6:
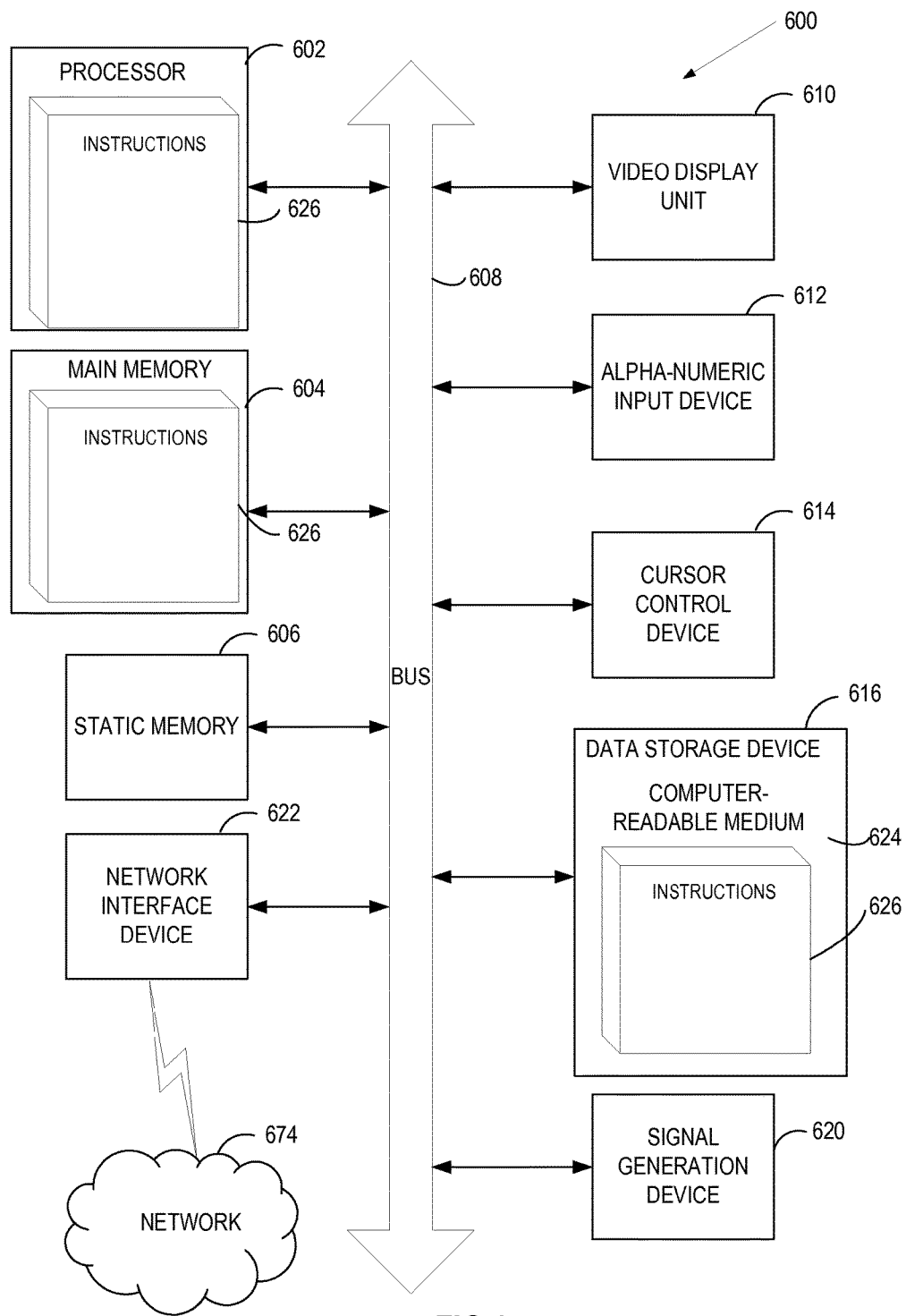
FIG. 6 depicts a block diagram of a computer system operating in accordance with one or more aspects of the present disclosure.

FIG. 6 depicts a block diagram of a computer system operating in accordance with one or more aspects of the present disclosure. In various illustrative examples, system 600 may correspond to example system 100 of FIG. 1.

In certain implementations, computer system 600 may be connected (e.g., via a network, such as a Local Area Network (LAN), an intranet, an extranet, or the Internet) to other computer systems. Computer system 600 may operate in the capacity of a server or a client computer in a client-server environment, or as a peer computer in a peer-to-peer or distributed network environment. Computer system 600 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 600 may include a processor 602, a volatile memory 604 (e.g., random access memory (RAM)), a non-volatile memory 606 (e.g., read-only memory (ROM) or electrically-erasable programmable ROM (EEPROM)), and a data storage device 616, which may communicate with each other via a bus 608.

Processor 602 may be provided by one or more processing devices such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 600 may further include a network interface device 622. Computer system 600 also may include a video display unit 610 (e.g., an LCD), an alpha-numeric input device 612 (e.g., a keyboard), and a cursor control device 614 (e.g., a mouse).

Data storage device 616 may include a non-transitory computer-readable storage medium 624 on which may store instructions 626 encoding any one or more of the methods or functions described herein, including instructions encoding access control data structure 999 of FIG. 1 implementing method 300 for controlling access to shared resources.

Instructions 626 may also reside, completely or partially, within main memory 604 and/or within processor 602 during execution thereof by computer system 600, hence, main memory 604 and processor 602 may also constitute machine-readable storage media.

While computer-readable storage medium 624 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", "associating" or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300, 500 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
   assigning identifiers of a sequence of identifiers to wakeup signals and to processing streams, the sequence of identifiers representing a chronological order that the wakeup signals are initiated and the processing streams begin waiting, wherein each of the identifiers is exclusively assigned to either a wakeup signal or a processing stream and the sequence of identifiers comprises a first identifier associated with a wakeup signal and a second identifier associated with a processing stream in a waiting state;
   receiving the wakeup signal associated with the first identifier after the processing stream associated with the second identifier enters the waiting state;
   responsive to the receiving the wakeup signal, comparing, by a processing device, the first identifier associated with the wakeup signal and the second identifier associated with the processing stream to determine that the processing stream began waiting after an initiation of the wakeup signal; and
   responsive to the comparing, waking at least one of the processing streams and avoiding waking the processing stream associated with the second identifier that began waiting during a time delay between the initiation of the wakeup signal and the receiving of the wakeup signal.

2. The method of claim 1, wherein determining that the processing stream began waiting after the initiation of the wakeup signal comprises determining that the first identifier is less than the second identifier.

3. The method of claim 1, wherein assigning the second identifier to the processing stream is performed in response to receiving a wait function call to block the processing stream.

4. The method of claim 1, wherein the wakeup signal is initiated by a wakeup function call.

5. The method of claim 1, wherein the first identifier and the second identifier are provided by condition variables.

6. The method of claim 5, further comprising resetting the first identifier responsive to determining that a value of the second identifier exceeds a threshold value, wherein the threshold value is a maximum value provided by the condition variables.

7. The method of claim 1, wherein the first identifier of the wakeup signal is stored in a futex data structure.

8. The method of claim 1, further comprising:
   assigning a third identifier to an additional processing stream, wherein the additional processing stream initiates a wait function call after the wakeup signal is initiated but prior to the wakeup signal being received;
   determining the third identifier of the additional processing stream is greater than the first identifier; and
   processing the wakeup signal without waking up the additional processing stream.

9. The method of claim 8, further comprising:
   grouping multiple processing streams into a plurality of groups comprising a first group and a second group, the first group comprising a first processing stream initiating a wait function call prior to the wakeup signal being initiated, and a second group comprises a second processing stream initiating a wait function after the wakeup signal being initiated;
   waking up the first processing stream in the first group without waking up the second processing stream in the second group; and
   associating the second processing stream with the first group after the first processing stream consumes the wakeup signal.

10. The method of claim 9, wherein associating the second processing stream with the first group is performed after removing one or more waiting processing streams from the first group.

11. The method of claim 9, wherein the first processing stream of the first group and the second processing stream of the second group are executing on a single machine.

12. A system comprising:
   a memory; and
   a processing device communicably coupled to the memory, the processing device to execute instructions to:
      assign identifiers of a sequence of identifiers to wakeup signals and to processing streams, the sequence of identifiers representing a chronological order that the wakeup signals are initiated and the processing streams begin waiting, wherein each of the identifiers is exclusively assigned to either a wakeup signal or a processing stream and the sequence of identifiers comprises a first identifier associated with a wakeup signal and a second identifier associated with a processing stream in a waiting state;
      receive the wakeup signal associated with the first identifier after the processing stream associated with the second identifier enters the waiting state;
      responsive to the receiving the wakeup signal, compare, by the processing device, the first identifier associated with the wakeup signal and the second identifier associated with the processing stream to determine that the processing stream began waiting after an initiation of the wakeup signal; and responsive to the comparing, wake at least one of the processing streams and avoiding waking the processing stream associated with the second identifier that began waiting during a time delay between the initiation of the wakeup signal and the receiving of the wakeup signal.

13. The system of claim 12, wherein the processing device further to reset the first identifier responsive to determining that a value of the second identifier exceeds a threshold value, wherein the threshold value is a maximum value.

14. The system of claim 12, wherein the processing device further to:

assign a third identifier to an additional processing stream, wherein the additional processing stream initiates a wait function call after the wakeup signal is initiated but prior to the wakeup signal being received;

determine the third identifier of the additional processing stream is greater than the first identifier; and process the wakeup signal without waking up the additional processing stream.

15. The system of claim 12, wherein the processing device further to:

group multiple processing streams into a plurality of groups comprising a first group and a second group, the first group comprising a first processing stream initiating a wait function call prior to the wakeup signal being initiated, and a second group comprises a second processing stream initiating a wait function after the wakeup signal being initiated;

wake up the first processing stream in the first group without waking up the second processing stream in the second group; and associate the second processing stream with the first group after the first processing stream consumes the wakeup signal.

16. A non-transitory machine-readable storage medium storing instructions which, when executed, cause a processing device to execute operations comprising:

assign identifiers of a sequence of identifiers to wakeup signals and to processing streams, the sequence of identifiers representing a chronological order that the wakeup signals are initiated and the processing streams begin waiting, wherein each of the identifiers is exclusively assigned to either a wakeup signal or a processing stream and the sequence of identifiers comprises a first identifier associated with a wakeup signal and a second identifier associated with a processing stream in a waiting state;

receive the wakeup signal associated with the first identifier after the processing stream associated with the second identifier enters the waiting state;

responsive to the receiving the wakeup signal, compare, by a processing device, the first identifier associated with the wakeup signal and the second identifier associated with the processing stream to determine that the processing stream began waiting after an initiation of the wakeup signal; and responsive to the comparing, wake at least one of the processing streams and avoiding waking the processing stream associated with the second identifier that began waiting during a time delay between the initiation of the wakeup signal and the receiving of the wakeup signal.

17. The non-transitory machine-readable storage medium of claim 16, wherein the instructions further comprise:

reset the first identifier responsive to determining that a value of the second identifier exceeds a threshold value, wherein the threshold value is provided by a maximum value of a condition variable.

18. The non-transitory machine-readable storage medium of claim 16, wherein the instructions further comprising:

assign a third identifier to an additional processing stream, wherein the additional processing stream initiates a wait function call after the wakeup signal is initiated but prior to the wakeup signal being received;

determine the third identifier of the additional processing stream is greater than the second identifier; and process the wakeup signal without waking up the additional processing stream.

19. The non-transitory machine-readable storage medium of claim 16, wherein the instructions further comprising:

group multiple processing streams into a plurality of groups comprising a first group and a second group, the first group comprising a first processing stream initiating a wait function call prior to the wakeup signal being initiated, and a second group comprises a second processing stream initiating a wait function after the wakeup signal being initiated;

wake up the first processing stream in the first group without waking up the second processing stream in the second group; and associate the second processing stream with the first group after the first processing stream consumes the wakeup signal.

* * * * *